June 26, 1962
H. WERKER
3,041,569
HEATING ELEMENT
Filed April 7, 1960
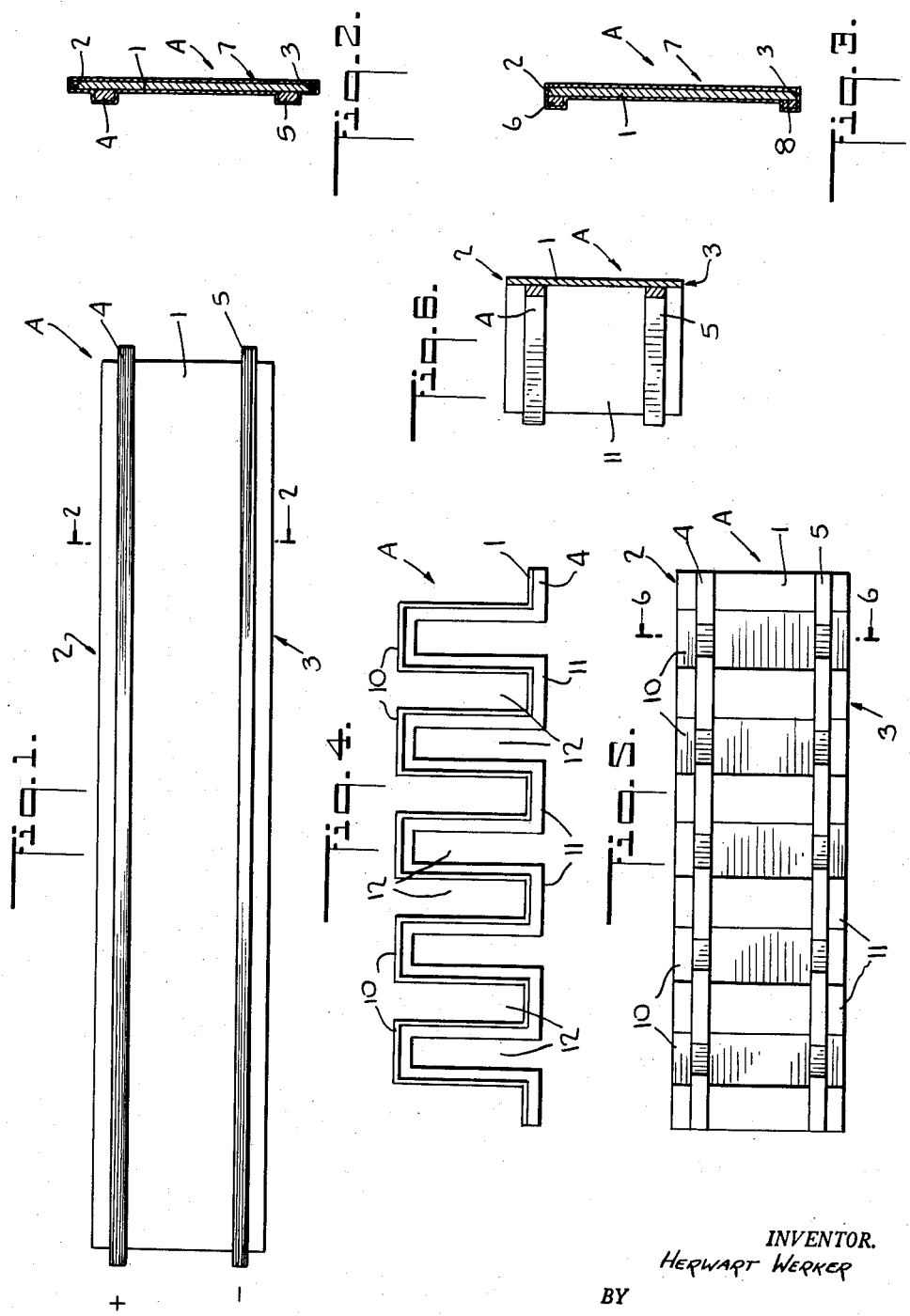
INVENTOR.
HERWART WERKER
BY
Andrew K. Foulds
his ATTORNEY United States Patent Office 3,041,569
Patented June 26, 1962

3,041,569
HEATING ELEMENT
Herwart Werker, Darien, Conn., assignor to American Radiator & Standard Sanitary Corporation, New York, N.Y., a corporation of Delaware
Filed Apr. 7, 1960, Ser. No. 20,671
1 Claim. (Cl. 338—203)

The present invention relates to an electrical heating element and more particularly to an improved electrical heating element adapted to heat by convective and by radiant heat transfer and further adapted to be used for baseboard and for convective type air heaters.

Heretofore, there have been many electrical heating elements which are adapted to heat by convective and by radiant heat transfer. These heating elements ordinarily utilize a resistance coil through which a current is passed to produce heat. Such electrical heating elements are usually manufactured according to detailed specifications for a specific heating requirement.

However, such heating elements have the disadvantage of not being easily adaptable to all situations. For example, if a particular heating problem does not require a specially constructed heating element, the builder approximates the required heat and the nearest standard heating element is used. The result is that the heating element produces too much heat or not enough heat. There is also a stocking problem due to the multiplicity of sizes to be kept available.

On the other hand, if a special situation arises where heaters of a standard size cannot be used, a special heating element must be built to fit that particular situation. Since such special situations are unique and rarely identical, all the work, molds, etc. which are used to make the special heating element are usually discarded or disassembled. It will be readily seen that such a procedure is both expensive and time-consuming.

Another disadvantage of such heating elements is that their adaptability is limited. Hence, heating elements for large scale heating requirements cannot be used for small requirements.

The present invention overcomes these defects and has for one of its objects the provision of an improved electrical heating element which may be easily adapted to handle any heating situation.

Another object of the present invention is to provide an improved electrical heating element which can be used for both large scale and small scale heating requirements.

Another object of the present invention is to provide an improved electrical heating element which can be manufactured in large quantities but which may easily be used in small quantities.

Another object of the present invention is to provide an improved electrical heating element in which the heat produced is directly proportional to the size of the element.

Another object of the present invention is to provide an improved heating element which can be sold to a user in bulk and which the user can easily sub-divide into numerous heating elements to fit each heating situation as it arises.

Another object of the present invention is to provide an improved electrical heating element which will heat a greater quantity of air per unit of space.

Another object of the present invention is to provide an improved heating element which is simple and inexpensive to manufacture.

Other and further objects of the invention will be obvious upon an understanding of the illustrative embodiment about to be described or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side elevational view of a heating element made in accordance with the present invention;

FIG. 2 is a sectional view thereof taken along line 2—2 of FIG. 1;

FIG. 3 is a sectional view showing a modification of the heating element;

FIG. 4 is a top plan view of the heating element arranged in accordance with the present invention to heat a greater amount of the air per unit space;

FIG. 5 is a side elevational view of the heating element shown in FIG. 4; and

FIG. 6 is a sectional view taken along line 6—6 of FIG. 5 from which, for clarity, the coating of insulating material has been eliminated.

Referring more particularly to FIG. 1, the heating element A comprises an elongated strip 1 of electrical resistance material which may be made of any suitable resistance material, through which a current is adapted to flow to produce heat. Adjacent upper and lower edges 2 and 3 of the strip of resistance material 1 are mounted electrical conductors 4 and 5, respectively. If desired, the heating element A may be made of substantially resilient or bendable or pliable material so that it may be rolled or folded or corrugated in use or for storage purposes.

The conductors 4 and 5 may be mounted on the strip of resistance material 1 in any conventional or desired manner, though, of course, they will be secured in efficient electrical conductive relation to the material 1. In FIGS. 1 and 2 the conductors 4 and 5 are shown as mounted on the sides of the strip 1 in spaced relation to upper and lower edges 2 and 3, respectively. In the modification shown in FIG. 3, the conductors 6 and 8 are mounted at the edges 2 and 3, respectively, of the strip 1 and flush therewith. It will be understood that either embodiment may be used with good results. A coating or sheath of a suitable insulating material 7 may be provided to insulate the resistance strip 1 and the conductors 4 and to prevent shorts and shock hazards. In FIG. 6, the coating of insulating material is not shown for clarity.

Electrical current is adapted to flow from one conductor to the other conductor through the strip of electrical resistance material thereby raising the temperature of the strip. For example, for simplicity, conductor 4 has been designated in the drawings as a "plus" conductor and the conductor 5 has been designated as the "minus" conductor. The current will flow from the "plus" to the "minus" conductor through the resistance strip 1 to thereby raise the temperature of the strip and produce heat. It will be understood, of course, that the current may be caused to flow in the opposite direction with the same result. It is, of course, also to be understood that the heating element is equally useful with alternating current, which will be its general or usual application.

With this structure, the heat produced is, in general, directly proportional to the length of the strip, i.e., the longer the strip is made, the greater the amount of heat which is produced. Since a constant voltage is applied across the two conductors 4 and 5 (110 or 220 volts in the usual installation) and the current flows from one conductor to the other through the strip 1, a transverse increment of the heating element A is in effect, in parallel to the other transverse increments so that the voltage across the two conductors 4 and 5 is the same throughout the length of the heating element A. Hence, with a constant voltage, if the heating element A is made longer, in effect, additional increments of resistance in parallel are added to decrease the resistance which increases the current to increase the heat. If the strip is made shorter, the number of increments of resistances in parallel are, in effect, reduced to thereby raise the resistance and decrease the current, hence decreasing the heat produced. It will therefore be seen that the arrangement allows the heat produced to be directly proportional to the length of the heating element A and if more heat is desired, it is merely necessary to make the heating element A longer. It will thus be seen that the heating element A of the present invention may be made in long strips and portions of desired length may be cut as specific heating needs arise. It may be mentioned that there will be a slight variation from a directly proportional relationship due to the voltage drop along the length of the conductors, but for practical purposes, the relationship may be considered directly proportional.

Such heating elements heat the air around the element and by convection the air in a room is likewise heated. There will also be heating of adjacent objects by radiation. To increase the amount of air heated from a given unit length, the heating element A is folded into a corrugated form having loops 10 and 11 as shown in FIGS. 4 to 6. The loops 10 and 11 of the corrugated heating element A are oppositely directed so that air channels 12 are formed in the spaces between loops 10 and 11 thus permitting more air to be heated per unit space. The length of the loops 10 and 11 also contributes to the amount of air heated per unit of space. Thus, if the loops 10 and 11 are made longer, the air channels 12 are also longer thus permitting a greater amount of air to be heated. With this structure, if the amount of air space to be used for heating purposes is limited, more heat will be produced per unit of space by using the corrugated heating element A shown in FIGS. 4 to 6.

Increased heat exchange will be accomplished by forced circulation as by a fan or blower over the heating element, either of the simple element of FIG. 1 or vertically through the turns or bends of the corrugations with respect to the plane of the paper in FIG. 4.

With the arrangement of the present invention, as described above, large strips of the heating element may be manufactured and sold to a builder who will then cut and corrugate the material to his own requirements depending on the type of installation he desires or the strip of heating element may be manufactured in corrugated form and sold to customers already corrugated. Since this material may be folded in a variety of ways, there will be a minimum of material wasted.

It will be seen that the present invention provides an improved electrical heating element in which the heat produced is substantially proportional to its length; which is easily adaptable to a variety of heating situations and which may be used for both large scale and small scale heating requirements. The present invention also provides an improved heating element which can be manufactured in large quantities at the same time permitting small sections of the element to be cut off as desired and which may be easily folded to heat a greater amount of air per unit space.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

In an air heating device, a strip of electric resistance sheet material, a pair of electric conductors extending lengthwise of said material and in electric conducting contact therewith throughout the length of said material; said material being so constituted that it may be readily and easily severed transverse to the length of said conductors and in accordance with desired heat output, said material being corrugated transverse to the length of said conductors and said material being positioned with its surface planes in the planes of air flow thereover so that the heat transfer from the resistance material to the surrounding air is multiplied for the length of the device transverse to the corrugations.

References Cited in the file of this patent

UNITED STATES PATENTS

| | | |
|---|---|---|
| 528,893 | Shaw | Nov. 6, 1894 |
| 905,045 | Ayer et al. | Nov. 24, 1908 |
| 2,608,634 | Abbott | Aug. 26, 1952 |
| 2,655,582 | Kirby | Oct. 13, 1953 |
| 2,683,673 | Silversher | July 13, 1954 |
| 2,878,357 | Thomson et al. | Mar. 17, 1959 |
| 2,891,303 | Stevenson | June 23, 1959 |